April 11, 1933.    G. SNIDER    1,903,519
APPARATUS FOR THE COMMERCIAL PREPARATION OF COFFEE BEVERAGES
Filed Sept. 22, 1928    3 Sheets-Sheet 1

INVENTOR.
Guido Snider
BY
C. F. Wenderoth
ATTORNEY.

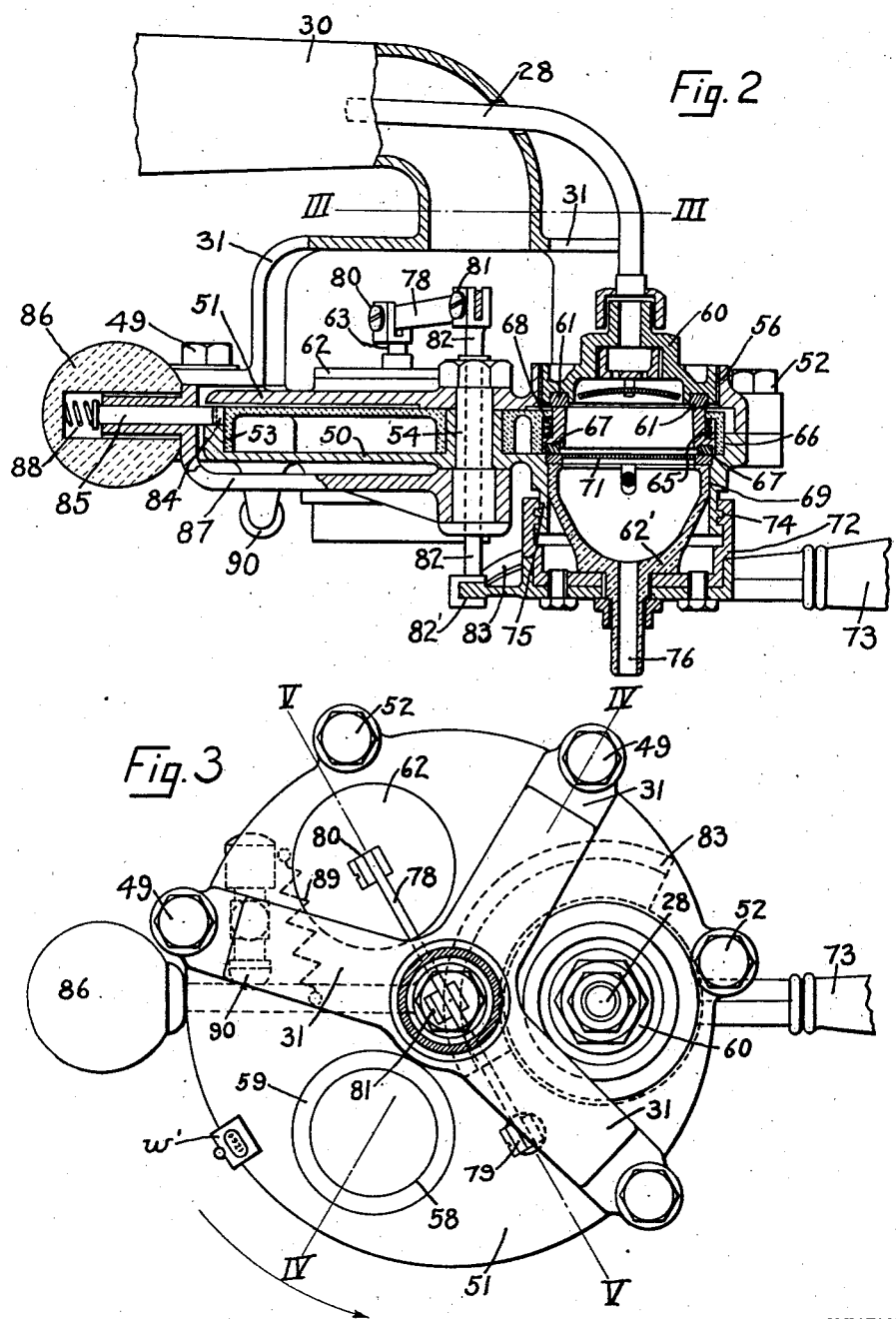

April 11, 1933.   G. SNIDER   1,903,519
APPARATUS FOR THE COMMERCIAL PREPARATION OF COFFEE BEVERAGES
Filed Sept. 22, 1928   3 Sheets-Sheet 3

INVENTOR.
Guido Snider
BY
E. F. Wenderoth
ATTORNEY.

Patented Apr. 11, 1933

1,903,519

UNITED STATES PATENT OFFICE

GUIDO SNIDER, OF MILAN, ITALY

APPARATUS FOR THE COMMERCIAL PREPARATION OF COFFEE BEVERAGES

Application filed September 22, 1928. Serial No. 307,701.

This invention relates to an apparatus for the commercial preparation of coffee, cup by cup and so constructed and operated that the coffee can be made practically continuously.

It is an object of the invention to provide a device which is operated electrically and which embodies various means and devices whereby the coffee can be prepared expeditiously with a minimum of power and manual labor and at the same time so expeditiously that a large number of people can be supplied with coffee in a minimum of time.

It is also a feature of this invention to provide the apparatus with a percolator having a rotating device cooperating therewith which is designed to provide sufficient coffee powder to the percolator to diffuse hot water and steam through said powder and to discharge the spent coffee after a cup of coffee has been prepared.

It is also a further object of the invention to provide a device having a semi-automatic percolator, a manually operated percolator and an immersion heater with means whereby hot water and steam may be directed to any one of these instrumentalities at will.

It is also a feature of the invention to provide a construction in which all the various elements are compactly and efficiently combined so as to occupy the smallest possible space.

Figure 1:
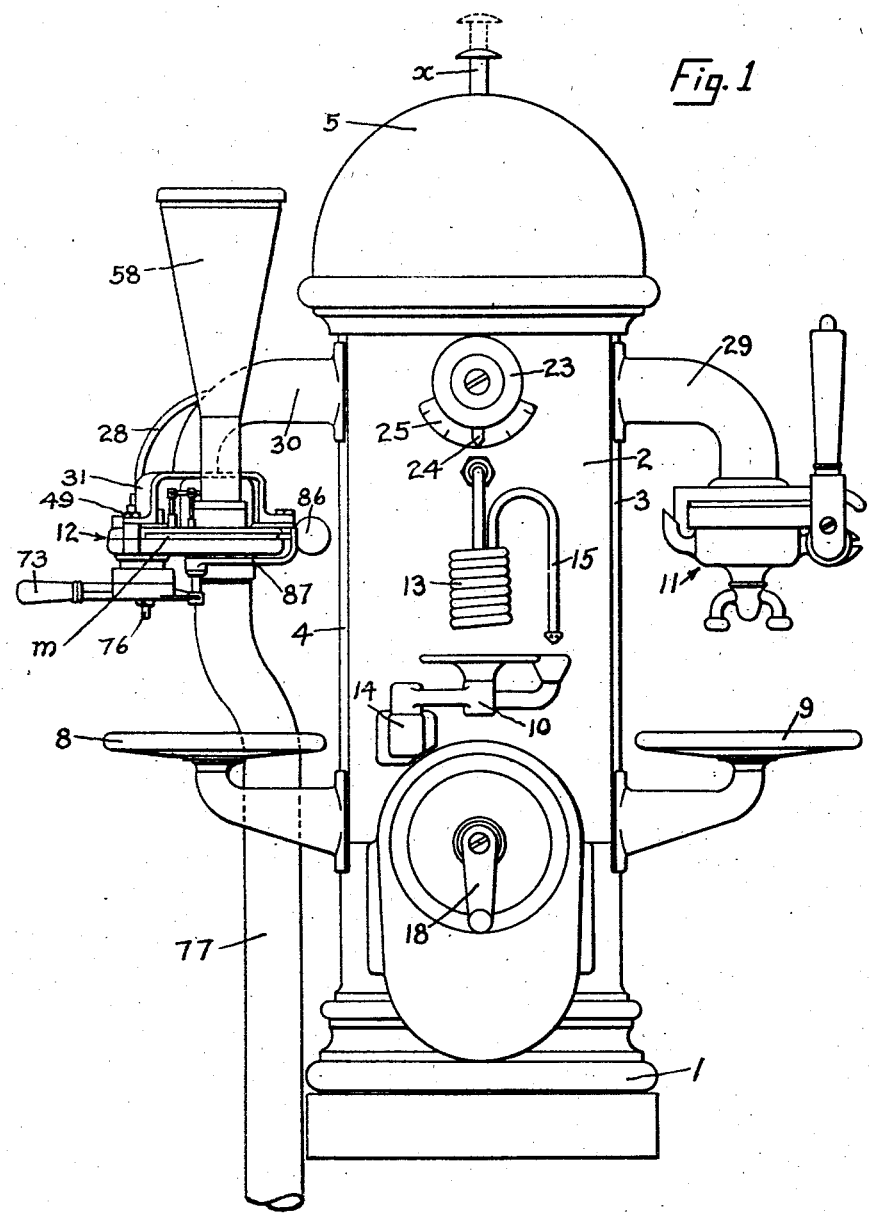
Figure 4:
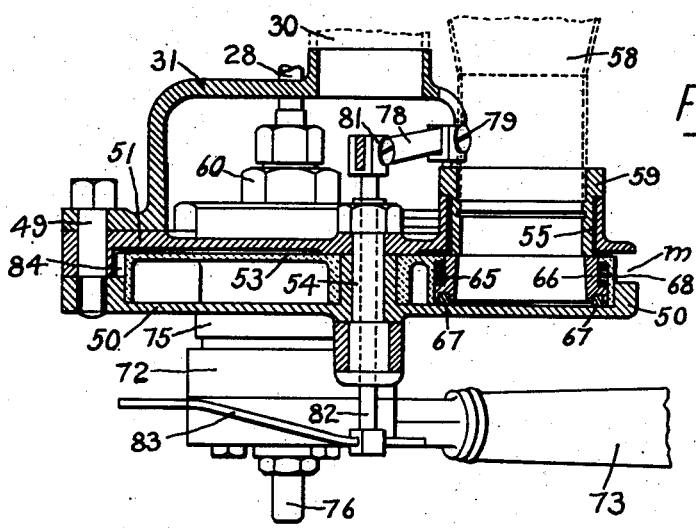
Figure 5:
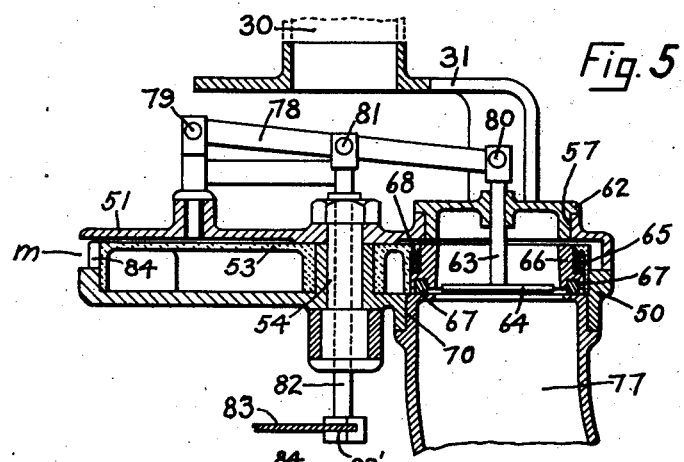
Figure 6:
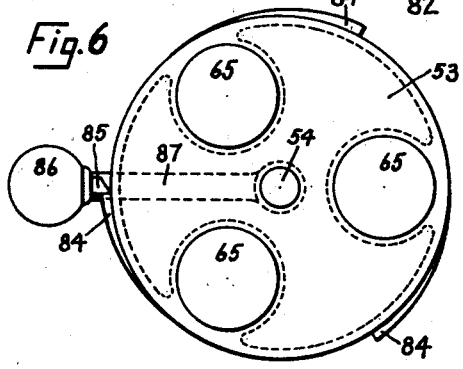

With these and other objects in view which will become apparent as the description proceeds, the invention consists in the combination and arrangement of parts hereinafter described, claimed in the claim and shown in the drawings, in which Figure 1 is a front elevation view of the apparatus, Figure 2 is a vertical sectional view through the semi-automatic percolator, Figure 3 is a plan view of the semi-automatic percolator, Figure 4 is a sectional view taken upon the section line IV—IV of Figure 3, Figure 5 is a sectional view taken upon the section line V—V of Figure 3, and Figure 6 is a plan view of the revolving feature with cooperating actuating mechanism used in the semi-automatic percolator.

Referring to the drawings, in which like reference characters are used throughout to indicate like parts in the various views, the apparatus consists of a frame which is preferably metallic having a base 1 which is designed to be supported upon a counter desk or shelf. The frame has a cylindrical body 2 having side apertures designed to be removably covered by the bolt plates 3 and 4. The top of the frame is enclosed by a dome 5.

General assembly

Extending from the outside of the body 2 are the cup supports 8, 9 and 10 arranged in spaced relation. Also extending from the outside of the body 2 arranged in cooperating relation with the cup support 9 is a percolator 11 of the ordinary type which is designed to be manually fed with coffee powder. Arranged in cooperating position with the cup support 8 is the semi-automatic percolator 12 shown more particularly in Figures 2 to 6, and arranged in cooperating relation with the cup support 10 is a coil pipe 13 for heating by immersion. The support 10 is equipped with a hollow pipe rotatable upon the pivot 14 in order to allow the discharge of condensation water from the end pipe 15 upon the coil pipe 13.

The percolators

Of the two percolators 11 and 12, the first need not be particularly described since it is of a common and ordinary construction well known in the art. However, in regard to percolator 12, this is of an essentially novel construction and will be described in detail. Reference is made particularly to the showing in Figures 2 to 6 inclusively.

The supporting arm 30 secured to the outside body member 2 has at the lower end thereof three divergent members 31 to which is secured a lower plate 50 by means of the bolts 49. The plate 50 has fastened to it at its upper surface a second plate 51 by means of the bolts 49 previously mentioned and also the bolts 52. The plates 50 and 51 are spaced from one another to form a chamber in which is located a third plate 53 constituting the feeder plate which is rotatable upon a central pivot member 54.

The upper plate 51 is provided with three circular apertures therein spaced 120° from one another and designated 55, 56 and 57. The apertures 55, 56 and 57 have circular vertical flanges surrounding the same.

A hopper 58 is located in the aperture 55 and the hopper is designed to contain coffee powder and is connected to the plate 51 by a threaded collar 59. The aperture 56 has therein a union piece or connection which in turn is connected with the pipe 28 through which hot water and steam is supplied. A washer 61 is located at the lower surface of the union piece or connection so as to ensure a water tight joint.

A cover plate 62 covers the aperture 57 and the cover plate is apertured centrally thereof to permit passage of a rod 63 carrying at its end below the cover plate 62 a piston 64 which is designed to remove spent coffee grounds.

The rotatable plate 53 is provided with three apertures 65 aligned with the apertures 55, 56 and 57 of the plate 51. A bushing 66 is located in each of the apertures 65 in the plate 53 and each bushing is provided with a washer 67 located between the bushing 66 and the lower plate 50 and which is urged into tight contact therewith by a coil spring 68 surrounding the bushing 66 and reacting against the plate 53 and a flange provided upon each bushing 66.

The plate 50 is provided with two apertures 69 and 70 which are aligned respectively with the apertures 56 and 57 of the plate 51. A strainer 71 is located over the aperture 69 and directly below the same is a percolator 62'. The percolator 62' is secured in position by means of a nut 72 which has secured thereto a handle 73. A collar 75 extends downwardly from the aperture 69 and may be either integral with the plate 50 or secured thereto in any desired manner. The collar 75 is provided with a thread which cooperates with the nut 72.

The operation of the turret percolator is as follows:

The plate 53 with the bushing 66 therein is rotated so as to bring one of the bushings 66 below the hopper 58 and coffee powder will be supplied from the hopper 58 so as to fill the bushing 66 directly thereunder. By then rotating the plate 56 120° the filled bushing 66 will be brought into position directly over the strainer 71 which covers the aperture 69 in the plate 50. The handle 23 located at the front of the apparatus is then turned so as to operate the valve 22 to connect the pipe 28 leading to the turret percolator with the water heater and water and steam will be conveyed to the coffee powder located in the bushing 66 positioned above the strainer 71. A deflector is preferably secured to the termination of the pipe 28 within the coupling member to scatter the hot water and steam over the entire surface of the coffee powder positioned above the strainer 71. The diffusion having been made the coffee beverage will flow through the pipe 76 upon the percolator 62' into a cup placed upon the support 8. After the beverage has been drained the plate 53 is again rotated through an arc of 120° and the bushing 66 having the spent coffee powder therein will be brought into alignment with the aperture 70 upon the plate 50 and by reciprocating downwardly the piston plate 64, the exhausted coffee powder is discharged into a pipe 77.

The operation of feeding and discharging the coffee powder takes place automatically. In the filling of the bushing 66 located below the hopper 58 the force of gravity effects the filling and the discharging of the spent coffee powder is accomplished by rotating the screw nut 72.

In order to accomplish the downward reciprocation of the piston plate 64 a lever 78 is provided pivoted at 79 to a member secured to the plate 51 180° removed from the aperture 57. The rod 63 is pivotally connected to the other end of the lever 78 and approximately at the center of the lever 78 a rod 82 passing through the aperture pivot 54 is pivoted at 81. The lower end of the rod 82 is provided with a slot 82' extending horizontally and this slot cooperates with a helicoidal sector 83 fixed upon the screw nut 72. It will be noted that when the screw nut 72 is unscrewed in order to release the plate 53 which has been previously clamped into position by screwing the nut 72, the sector 83 will slide in the slot 82' and raise the rod 82 and thereby the piston 64 in order to clear the plate 53 when rotated. When the next charge of coffee powder is located in position over the percolator 62' and the screw nut 72 is rotated in order to clamp the bushing 66 with its charge of coffee powder in position, the sector carried by the nut 72 will lower the rod 82 and the piston plate 64 and thereby remove the coffee powder which has been exhausted from the bushing 66 into the discharge member 77.

In order to provide for the rotation of plate 53 there are provided upon the plate three peripheral teeth 84 shown more particularly in Figure 6. The teeth are arranged 120° apart from one another and are designed to be successively engaged by a ratchet pawl 85. The pawl 85 is positioned within the handle 86 which in turn is secured to a lever 87 which is also pivoted upon the pivot 54 beneath the plate 50. The ratchet pawl is resiliently urged inwardly against the periphery of the plate 53 by a coil spring 88 located inside of the handle member 86. The pawl 85 extends through a slot $m$ formed between the plates 50 and 51. To rotate the plate 53 it is only necessary to operate the handle 85 through an arc of 120°. The return spring 89 will return the lever 87 into engagement with a tooth 84 which is to be operated upon in order to secure the next rotation of the plate 53. A buffer 90 is also provided to take up the shock of the return movement of the lever 87 to position.

If desired, a recorder $w'$ may be connected to the plate 51 upon the turret percolator so as to be actuated upon each oscillation of the handle member 86 to thereby count the number of cups of coffee prepared.

It is believed that the operation of the entire device is clear from the above description.

It is obvious that various changes and modifications may be made in the invention as disclosed above and it is the intention to claim all such changes and modifications as will fall within the spirit of the following claim.

I claim:—

An apparatus for the preparation of a beverage comprising a pair of fixed horizontal plates in spaced relation, a feed plate positioned between said fixed plates having a series of apertures therein, bushings located in said apertures, the upper fixed plate having a series of apertures therein with which the apertures in said feed plate are adapted to be aligned, a supply station connected with one of said apertures in said upper fixed plate, hot water and steam conducting means connected with another of said apertures in said upper plate defining a brewing station, discharge mechanism associated with another aperture in said upper plate defining a discharge station, the lower fixed plate having an aperture therein aligned with the aperture in said upper fixed plate above which is located the supply means, a percolator located in said last mentioned aperture, means for detachably securing said percolator in position, a cam track upon said means for securing said percolator in position, said lower plate having another aperture therein in alignment with the aperture in said upper fixed plate above which said discharging means are located and means operated by said cam track for operating said discharging means.

In testimony whereof I have set my hand this day, Sept. 11, 1928.

GUIDO SNIDER.